United States Patent [19]

Drew et al.

[11] Patent Number: 5,511,385
[45] Date of Patent: Apr. 30, 1996

[54] INDEPENDENT COMPARTMENT TEMPERATURE CONTROL FOR SINGLE-PACK OPERATION

[75] Inventors: Diane G. Drew, Suffield; Douglas L. Christians, Vernon, both of Conn.

[73] Assignee: United Technologies Corp., Hartford, Conn.

[21] Appl. No.: 363,736

[22] Filed: Dec. 23, 1994

[51] Int. Cl.⁶ ................................................. F25D 9/00
[52] U.S. Cl. ................................. 62/172; 62/87; 62/402
[58] Field of Search ......................... 62/172, 402, 87, 62/510; 454/72

[56] References Cited

U.S. PATENT DOCUMENTS

| | | | |
|---|---|---|---|
| 2,767,562 | 10/1956 | Hall | 62/402 X |
| 3,177,679 | 4/1965 | Quick et al. | 62/402 |
| 4,283,924 | 8/1981 | Schutze | 62/402 |
| 4,550,573 | 11/1985 | Rannenberg | 62/172 |
| 4,966,005 | 10/1990 | Cowell et al. | 62/79 |
| 5,309,724 | 5/1994 | Schreiber et al. | 62/87 |

FOREIGN PATENT DOCUMENTS

| 2237372 | 5/1991 | United Kingdom | 62/172 |
|---|---|---|---|

*Primary Examiner*—William E. Wayner
*Attorney, Agent, or Firm*—Richard H. Kosakowski; Holland & Bonzagni

[57] ABSTRACT

A dual-pack, aircraft environmental control system has each pack dedicated to providing a temperature-controlled air supply to a corresponding compartment, either the crew or passenger, of the aircraft. Each refrigeration pack is fed hot, compressed bleed air from an associated turbine engine on the aircraft. During normal operation, the pack associated with a particular compartment on the aircraft provides the air supply with independent temperature control to that compartment. However, during failure of one of the refrigeration packs and the resulting operation of the other pack, the environmental control system is able to provide independent temperature control of the air supplied to each compartment.

21 Claims, 2 Drawing Sheets

FIG. 2

INDEPENDENT COMPARTMENT TEMPERATURE CONTROL FOR SINGLE-PACK OPERATION

BACKGROUND OF THE INVENTION

This invention relates to an aircraft environmental control system, and more particularly to an aircraft environmental control system having two separate air cycle machine refrigeration packs, and having the ability to provide independent temperature control for each of the passenger and crew compartments on the aircraft in the event of a failure or inoperability of one pack and the resulting single-pack operation.

An aircraft environmental control system ("ECS") is used to cool, filter, dehumidify, pressurize and otherwise condition the air supplied to both the crew (a.k.a., cockpit, flight deck) and passenger (a.k.a., cabin) compartments. The ECS typically utilizes a source of hot compressed air, such as bleed air from the turbine engine compressor section (during aircraft flight with the engine operating), the auxiliary power unit ("APU") (during ground operation), or both. The hot pressurized bleed air is then typically expanded and cooled in an air cycle machine ("ACM") and associated heat exchangers to provide a cool air supply to the crew and passenger compartments.

On an aircraft having two or more turbine engines, it is known to utilize a first refrigeration system or "pack" for providing the air supply to the crew compartment, and a second, identical refrigeration pack for providing the air supply to the passenger compartment. The two dedicated packs typically operate independently of each other in controlling, inter alia, the temperature of the air supply fed to the associated compartment. Usually, separate and independent temperature controllers are provided for controlling the temperature of the air supplied to the crew and passenger compartments, respectively.

A problem arises, however, in such environmental control systems when there is an operational failure or a forced shut down of either pack. The single pack left operating still supplies air to the associated compartment. However, the single operational pack is now the only supply of air to the compartment associated with the failed pack. For example, upon failure of the flight deck pack, the cabin pack supplies air to both the crew and passenger compartments. However, the temperature of the air supplied to the crew compartment is determined solely by the temperature controller for the passenger compartment. Therefore, the air supplied to the flight deck may not be of a desired temperature. This is sometimes problematic because often the crew and passenger compartments are operated at different temperatures, primarily owing to the different volumes of each compartment and the contents thereof. For example, the crew compartment often contains sophisticated electronic circuitry that requires climate control. On the other hand, the passenger compartment contains a greater number of human passengers.

Heretofore, no known twin-pack environmental control system has been developed that allows the temperature of both compartments to be independently controlled in the event of failure or shut down of one of the packs without adding additional control systems.

Accordingly, it is a primary object of the present invention to provide an aircraft environmental control system that normally provides a pair of independently-operated refrigeration packs, one dedicated to the crew compartment and the other dedicated to the passenger compartment, but provides for independent temperature control of both the crew and passenger compartments during failure of one pack and resulting single-pack operation.

The above and other objects and advantages of the present invention will become more readily apparent when the following description is read in conjunction with the accompanying drawings.

SUMMARY OF THE INVENTION

To overcome the deficiencies of the prior art and to achieve the objects listed above, the applicants have invented an improved environmental control system for an aircraft. In a preferred embodiment, the ECS includes two separate, independent refrigeration packs, each pack comprising dual heat exchangers, a three-wheel air cycle machine, and a condensing heat exchanger, together with associated valves and duct work. A first pack is dedicated to providing a controlled air supply to the crew compartment of the aircraft, while a second pack is dedicated to providing a controlled air supply to the passenger compartment of the aircraft. Each pack is fed bleed air from either a particular aircraft engine or from an auxiliary power unit.

During normal two-pack operation, each pack operates independently with regard to being able to control the temperature of the air supplied to the dedicated compartment. However, during a failure or inoperability of one pack and the resulting operation of the other pack, the compartment associated with the failed pack is still able to have an air supply at a temperature that can be controlled independently of the temperature of the air supplied by the operating pack to its associated compartment. This is achieved by routing engine bleed air from the engine associated with the operable pack also through a valve whose position is controlled by the temperature controller for the compartment associated with the failed pack. The bleed air is then mixed with air recirculated from one of the aircraft compartments; typically, the passenger compartment. This mixed air is then further mixed with the air from the operable pack, and the resulting overall mixture is fed to the compartment associated with the failed pack.

A temperature sensor is located in the duct work downstream near the entrance of the air into the compartment. The temperature sensor provides a signal to the air temperature controller for the compartment associated with the failed pack. The signal is indicative of the temperature of the air supplied to the compartment and is converted by the controller to a rate of change of the air temperature. Another temperature sensor in the compartment itself provides a signal indicative of the temperature of the air in that compartment associated with the failed pack. These two sensed temperature values are compared by the controller to a signal indicative of a desired compartment temperature from a manually or automatically adjustable device in the compartment. Any difference between actual and desired temperature is interpreted to be an error signal that is used to modulate the valve to either increase or decrease the amount of hot bleed air mixed with the recirculated air and the pack air. In this way, independent temperature control of the air supplied to the compartment associated with the failed pack is maintained.

BRIEF DESCRIPTION OF THE DRAWINGS

FIG. 2 is a schematic illustration of the aircraft environmental control system of FIG. 1 in accordance with an alternative embodiment.

DETAILED DESCRIPTION OF THE PREFERRED EMBODIMENTS

Figure 1:
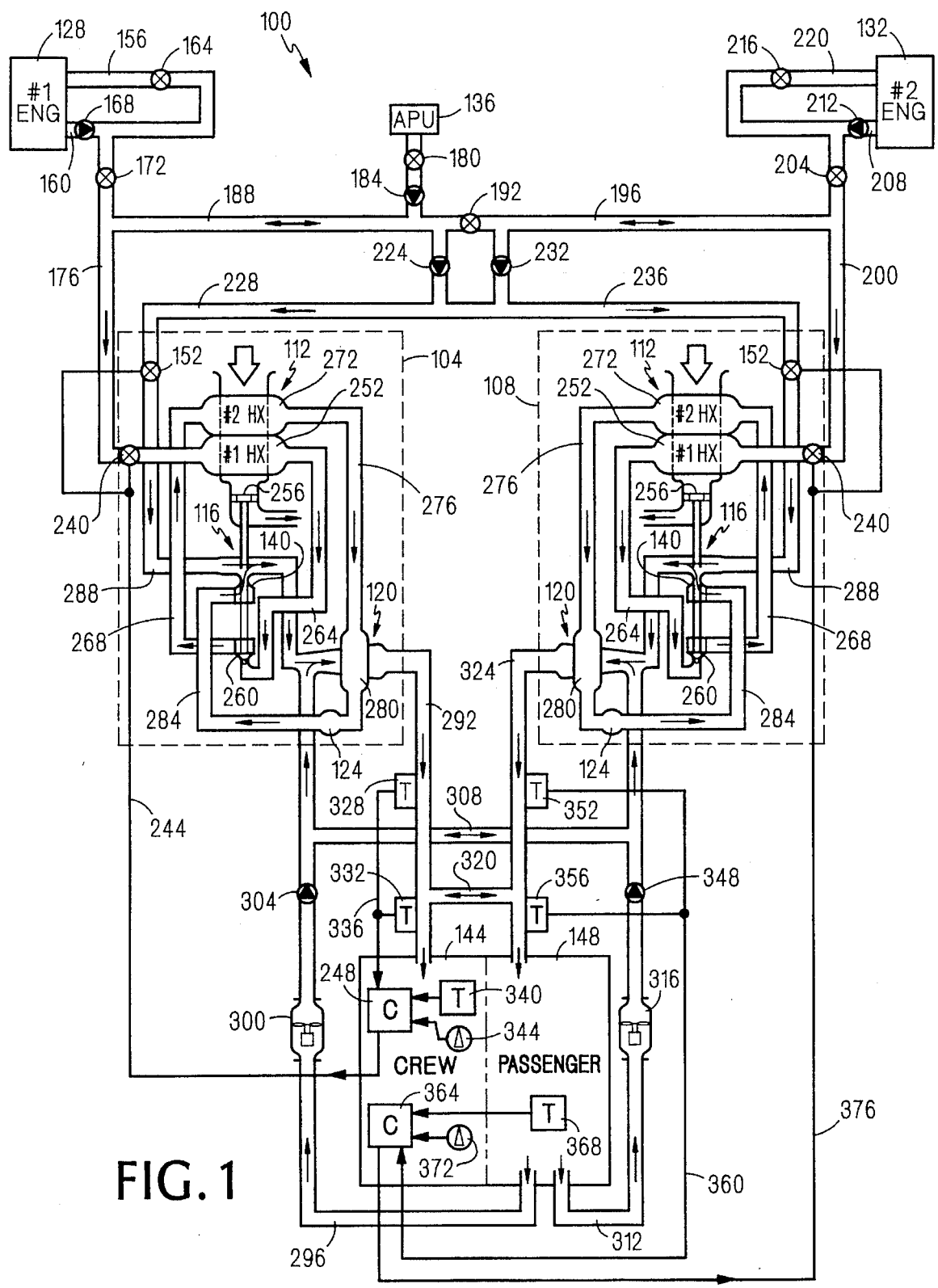
FIG. 1 is a schematic illustration of an environmental control system having a pair of refrigeration packs, each pack dedicated to providing air to an associated aircraft compartment, the control system being operable during failure or shut down of one of the packs to provide independent temperature control of the air supplied to both compartments, in accordance with the present invention.

Referring to the drawings in detail, an aircraft environmental control system in accordance with the present invention is illustrated therein and generally designated by the reference numeral 100. The ECS 100 includes a pair of identical refrigeration packs 104, 108. Each pack 104, 108 comprises a dual heat exchanger 112, a three-wheel air cycle machine 116, a condensing heat exchanger 120, a water collector 124, and associated valves and duct work. Each refrigeration pack 104, 108 is fed hot, compressed bleed air from the compressor stage of a turbine engine 128, 132 during flight, or from an auxiliary power unit 136 during ground operation. The conditioned bleed air from the turbine portion 140 of the air cycle machine 116 is mixed with hot bleed air, and further mixed with air recirculated from the corresponding compartment 144, 148 on the aircraft, typically, the passenger compartment 148, and possibly with air from the opposite pack 104, 108. The resulting mixture is fed to the corresponding compartment 144, 148. The temperature of the air supplied to the compartment 144, 148 is controlled by modulating the amount of bleed air mixed with the air exiting the turbine portion 140 of the air cycle machine 116. During normal two-pack operation, each pack 104, 108 provides air of an independent temperature to the corresponding compartment 144, 148. However, during a failure of one of the packs 104, 108 and resulting single-pack operation, bleed air supplied from only one engine 128, 132 is routed to the operating pack 104, 108 and to the modulating valve 152 of the inoperable pack 104, 108. The operable pack 104, 108 functions as normal. However, for the compartment 144, 148 associated with the inoperable pack 104, 108, bleed air modulated by the valve 152 is mixed with the air recirculated from the passenger compartment 148, and then further mixed with air from the operable pack 104, 108. The resulting mixture is then fed to the compartment 144, 148 associated with the failed pack 104, 108. Independent temperature control of the compartment 144, 148 associated with the failed pack 104, 108 is maintained by modulating the amount of bleed air mixed with the recirculated air and also with the air from the operable pack 104, 108.

Referring now to FIG. 1, there illustrated is a schematic diagram of an aircraft ECS 100 according to the present invention. The ECS is typically utilized on an aircraft having at least two jet aircraft engines 128, 132 and an auxiliary power unit 136. The left-hand engine 128, or number one engine 128, supplies hot bleed air of either a high pressure in a duct 156 or a low pressure in a duct 160. The high pressure bleed air duct 156 has a solenoid-operated pneumatic valve 164 in-line that may be opened to allow use of the high pressure bleed air. When this valve 164 is closed, the low pressure bleed air passes through a check valve 168 in the low pressure bleed air duct 160. The bleed air then passes through a solenoid-actuated pneumatic pressure valve 172 which remains open during operation of the corresponding refrigeration pack 104 to which the bleed air is supplied in a duct 176. Bleed air is typically provided by the compressor stage of the engine 128 during normal aircraft flight. However, during ground operation of the craft when the main aircraft engines 128, 132 are not running, the bleed air may be provided to both packs 104, 108 by the APU 136. In such instance, the bleed air valve 172 remains closed, and a valve 180 at the output of the APU 136 would then be opened to allow the bleed air from the APU to pass through a check valve 184 and into a supply duct 188 down into the input of the first refrigeration pack 104, and through an electrically-operated valve 192 and through a supply duct 196 down through a duct 200 into the input of the second refrigeration pack 108. A valve 204, similar to valve 172, would also be closed during ground operation.

In a similar manner to the left-hand or number one engine 128, the right-hand or number two engine 132 provides hot, compressed bleed air of a low pressure in a duct 208 through a check valve 212 and down through the solenoid-operated valve 204. Bleed air of a high pressure may be provided through a valve 216 in a duct 220 fed down in the duct 200 to the input of the second pack 108.

During normal two-pack operation, and during aircraft flight, the number one engine 128 provides the bleed air to the input of the first pack 104 in the duct 176, and also provides the bleed air in the supply duct 188 and down through a check valve 224 and into a manifold duct 228. The APU valve 180 is closed, as is the valve 192 in the supply lines 188, 196. In a similar manner, the right-hand or number two engine 132 provides the bleed air in the duct 200 down to the input of the refrigeration pack 108, and also in the supply line 196 and down through a check valve 232 and into a manifold duct 236.

However, whenever the APU 136 is supplying the hot pressurized air, the valves 180 and 192 are open and bleed air from the APU 136 passes through the supply ducts 188, 196, the check valves 224, 232, and the hot air manifold ducts 228, 236.

The bleed air from the left-hand engine 128 in the duct 176 passes through the valve 240, which may comprise an electrically-operated, butterfly-type valve that is modulatable in response to a signal on a line 244 from a temperature controller 248 located in the crew compartment 144. This valve 240 works in unison with a second similar butterfly-type valve 152 disposed in the manifold duct 228. That is, these two valves 152, 240 are scheduled together and operate simultaneously. The first butterfly valve 240 controls the amount of bleed air fed to the input of a primary heat exchanger 252 that forms part of a dual heat exchanger 112. This bleed air passing through the heat exchanger 252 is cooled by ram air, which is ambient air vented from outside the aircraft that is much cooler in temperature than the bleed air passing through the warm path of the primary heat exchanger 252. A fan rotor 256 disposed downstream in the dual heat exchanger 112 forms a part of a three-wheel air cycle machine 116. The ACM 116 also includes a turbine portion 140 and a compressor portion 260, all connected together by a common shaft. The fan rotor 256 urges or assists the ram air flow through the dual heat exchanger 112.

The bleed air passes through the primary heat exchanger 252, and is then fed in a duct 264 to the compressor rotor portion 260 of the ACM 116. The compressor 260 compresses and reheats the bleed air and passes the compressed bleed air output in a duct 268 to an input of the secondary heat exchanger portion 272 of the dual heat exchanger 112. The compressed bleed air is then cooled again by ram air vented from outside the craft.

The primary and secondary heat exchangers 252, 272 may be housed in the single unit and be of the, e.g., plate fin type, wherein hot and cold paths of each heat exchanger 252, 272 are in a cross-flow heat exchange relationship. In a similar manner to the primary heat exchanger 252, ram air is used to cool the compressed bleed air passing through the cold side of the secondary heat exchanger 272 by removing the heat of compression. After passing through the dual heat exchanger 112, the fan 256 forcibly discharges the ram air overboard. Although not shown, a valve may be provided in the fan exhaust duct and may be modulated to regulate the flow rate of the ram cooling air.

In the foregoing description and in the description that follows, arrowheads are placed on the figures to illustrate the direction of the air flow in the corresponding ducts or flow paths.

After emerging from the secondary heat exchanger 272, the bleed air is fed in a duct 276 to the warm or condenser portion 280 of the condensing heat exchanger 120. The bleed air passing through the condenser 280 is cooled by cooler air from the turbine portion 140 of the ACM 116. After passing through the condenser 280, the bleed air passes through a water separator 124 which removes entrained moisture in the bleed air. Although not shown, this moisture collected in the water separator 124 may be fed to a nozzle located at the ram air inlet of the dual heat exchanger 112 to provide moisture thereto to aid in the cooling of the warm bleed air passing through both the primary and secondary heat exchangers 252, 272.

After passing through the water separator 124, the bleed air is fed in a duct 284 into the turbine portion 140 of the ACM 116 where it is expanded and cooled. The energy extracted from the bleed air in the turbine portion 140 is used to drive the shaft of the ACM 116 to power or rotate both the fan and the compressor portions 256, 260 of the ACM 116.

After emerging from the turbine portion 140 of the ACM 116, the bleed air is mixed with the hot bleed air passing in a duct 288 from the second butterfly valve 152. These airs are mixed in a mixer portion of the condensing heat exchanger 120. The butterfly valve 152, as mentioned hereinbefore, is controlled by the temperature controller 248 in the crew compartment 144 to provide an amount of bleed air to mix with, and adjust the temperature of, the air exiting the turbine portion 140 of the ACM 116. This mixed air is then further mixed with air recirculated from the passenger compartment 148. That is, air from the passenger compartment 148 is fed in a duct 296 through an electrically-operated fan 300 that urges this recirculated air through the duct 296 and through a check valve 304, and then to the point of mixture of the recirculated air with the mixture of the bleed air and the turbine air. This resulting overall mixture is then fed through the condensing heat exchanger 120 where it is used to cool the bleed air in the duct 276 from the secondary heat exchanger 272.

A crossover duct 308 downstream of the check valve 304 in the recirculated air duct 296 may be provided and connected with the corresponding recirculated air duct 312 associated with the passenger compartment 148. This allows the air exhausted from the passenger compartment 148 in the separate ducts 296, 312 to mix together. In the alternative, recirculated air for the crew pack 104 could be taken from the crew compartment 104. Typically, however, recirculated air for both packs is taken from the passenger compartment 148 (as in the preferred embodiment), since it has a greater volume of air than the crew compartment 144.

The resulting air supply at the output of the condensing heat exchanger 120 represents the output of the refrigeration pack 104 in the duct 292. The refrigeration packs 104, 108 may comprise the Model R79-3WR pack provided by Hamilton Standard, a division of United Technologies Corporation, the assignee of the present invention.

The resulting air in the entrance duct 292 represents an air supply that is then fed into the crew compartment 144. A crossover supply duct 320 connects this entrance duct 292 to a similar entrance duct 324 at the output of the second refrigeration pack 108. In this way, the air supplied by each pack 104, 108 may be intermixed with each other, if desired.

The entrance duct 292 for the crew compartment also has a pair of temperature sensors 328, 332 associated therewith; a first sensor 328 provided upstream of the supply crossover duct 320 and used for sensing the temperature of the air supply in the entrance duct 292 during normal operation; a second sensor 332 provided downstream of the supply crossover duct 320 and used for sensing the air supply temperature in the entrance duct 292 during operation with the pack failed. Both sensors 328, 332 provide corresponding signals, indicative of the entrance duct temperature of the air supply, on a signal line 336 to the temperature controller 248 located in the crew compartment 144. Additional one or more temperature sensors 340 are provided within the crew compartment 144 at various locations therein for sensing the temperature of the compartment 144 and providing signals to the temperature controller 248. A manually- or automatically-adjustable device 344, such as a dial-adjustable potentiometer, is used to provide a signal to the temperature controller 248 indicative of a desired temperature within the crew compartment 144. The temperature controller 248 operates in a well-known manner to take the rate of change (i.e., the derivative) of the temperature of the air supply provided in the entrance duct 292 and compares it to the actual temperature of the air within the compartment 144, and also compares it to the desired temperature, and formulates an error signal indicative of any difference therebetween. The controller 248 then modulates the second butterfly valve 152 by a signal on a line 244 to control the amount of hot bleed air in the hot manifold duct 228 that is mixed with the air output from the turbine portion 140 of the ACM 116, and further mixed with the recirculated air. In this way, the temperature controller 248 provides for independent temperature control of the air supplied to the crew compartment 144.

In a similar manner, the bleed air from the right-hand engine 132 is provided in the duct 200 to the input of the second refrigeration pack 108, which may be identical in structure and function to the first pack 104. Thus, identical reference numbers are used to refer to components that are identical in each pack 104, 108. The bleed air is fed through a first butterfly valve 240 and then input to the warm side of a primary heat exchanger 252. This bleed air is cooled by the ram ambient air, and the cooled bleed air is then fed in a duct 264 into the compressor portion 260 of a three-wheel ACM 116. The compressed air output is fed in the duct 268 to the input of a secondary heat exchanger 272 that forms part of the dual heat exchanger 112 of this second refrigeration pack 108. The compressed bleed air is then again cooled by the ram ambient air. A fan portion 256 of the ACM 116 assists in urging the ram air through the dual heat exchanger 112, and also vents the ambient air overboard.

The cooled bleed air output from the secondary heat exchanger 272 is passed in a duct 276 through the condenser portion 280 of a condensing heat exchanger 120, and then through a water separator 124 where any entrained moisture in the bleed air is removed. The bleed air is then fed in a duct 284 through the turbine portion 140 of the ACM 116. At the output of the turbine portion 140, bleed air is mixed with bleed air fed through the modulating second butterfly valve 152. The input to this butterfly valve 152 is the bleed air in the manifold duct 236. The manifold duct 236 is fed by the bleed air from the engine 132 passing through the supply duct 196 and then through a corresponding check valve 232.

The bleed air mixed with the air from the turbine portion 140 of the ACM 116 is then mixed with air recirculated from the passenger compartment 148, that is fed in a duct 312 through an electric motor 316, and a check valve 348, to where it merges with mixed bleed and turbine output air. The resulting mixture is then passed through the condensing heat exchanger 120, and is output from the second refrigeration pack 108.

In a similar manner to the first pack 104, the output of the second pack 108 represents a supply of air at a temperature that is fed through an entrance duct 324 and into the passenger compartment 148. Similar to the entrance duct 292 for the crew compartment 144, the entrance duct 292 for the passenger compartment 148 contains a pair temperature sensors 352, 356 disposed on either side of the supply crossover duct 320. These sensors 352, 356 provide their signals on a signal line 360 to the temperature controller 364 for the passenger compartment 148. This temperature controller 364 is also located in the crew compartment 144. That is, both the temperature controller 364 for the crew compartment 144 and the controller 364 for the passenger compartment 148 are located in the crew compartment 144 where the crew can both control and monitor the temperature in both compartments 144, 148. Additional one or more temperature sensors 368 are located at various locations in the passenger compartment 148 and provide signals back to the passenger temperature controller 364. Also, an adjustable device 372 provides a signal indicative of a desired temperature within the passenger compartment 148 to the controller 364.

The temperature controller for the passenger compartment 148 is responsive to the temperature signal from the entrance duct 324 in taking the rate of change of this temperature and comparing it to the actual temperature of the passenger compartment 148, and also comparing it to the desired temperature of the passenger compartment 148 and generating an error signal indicative of any difference therebetween. This error signal is provided on a line 376 back to the second butterfly valve 152 to control the amount of bleed air passing in the hot air manifold duct 236 to be mixed with the air from the turbine portion 140 of the ACM 116. In this way, the environmental control system 100 of the present invention provides for independent temperature control of the passenger compartment 148.

During normal two-pack operation, both packs 104, 108 operate independently of each other to control the temperature of its respective compartment 144, 148. Also during normal two-pack operation, the supply crossover duct 320 usually passes air therethrough, since the passenger compartment 148 typically is much larger than the crew compartment 144. Therefore, more than half of the total supply air from both refrigeration packs 104, 108 is ducted to the passenger compartment 148, while the remainder of the total supply air is supplied to the crew compartment 144. Excess air flow from the crew compartment refrigeration pack 104 is diverted to the passenger compartment 148 through the supply crossover duct 320. Normally, the passenger compartment temperature controller 364 has sufficient authority to adjust its pack 108 for proper temperature control. In a typical ECS 100, each temperature controller 248, 364 can adjust the temperature of the air supplied to the corresponding compartment 144, 148 within a range of 37° F. and 168° F.

Further, during normal two-pack operation, each temperature controller 248, 364 uses only the temperature signal from the sensor 328, 352 located upstream of the supply crossover duct 320. This is because icing conditions could be caused at the turbine portion 140 outlet of the air cycle machine 116 if temperature sensing were to be carried out downstream of the supply crossover duct 320. However, during single-pack operation, the temperature controller 248, 364 for each compartment 144, 148 utilizes the temperature signal from the sensor 332, 356 located downstream of the supply crossover duct 320. This is the reason for the inclusion of two temperature sensors 328, 332, 352, 356 for sensing the temperature of the air supply in each entrance duct 292, 324.

The foregoing description has described and illustrated in detail the operation of the ECS 100 of the present invention during normal operation of both refrigeration packs 104, 108. However, the present invention has utility during the situation where one of the refrigeration packs 104, 108, either the crew pack 104 or the passenger pack 108, is inoperable for whatever reason. That is, the ECS 100 of the present invention has the ability to provide an air supply for the compartment associated with the failed pack at a temperature that is independent of the temperature of the air supplied to the compartment associated with the operable pack. A failed pack situation will be described hereinafter in which it is assumed that the refrigeration pack 104 associated with the crew compartment 144 has failed or is inoperable, for whatever reason, including a desired shut down. However, it should be understood that the following description is equally applicable to the reverse situation; that is, the situation where the refrigeration pack 108 associated with the passenger compartment 148 has failed and the refrigeration pack 104 associated with the crew compartment 144 is operable.

During a failure of the refrigeration pack 104 associated with the crew compartment 144, the solenoid-operated pneumatic valve 172 in the bleed air supply from the left-hand engine 128 is now closed. Assuming flight operation, the valve 180 at the output of the APU 136 remains closed. Also, the valve 192 in the bleed air supply lines 188, 196 also remains closed, similar to the situation where both packs 104, 108 are operable. The bleed air supplied from the second engine 132 passes through the valve 204, which remains open, and the bleed air is fed on the supply line 196 and down through the check valve 232. This bleed air then splits and is fed through both sides of the hot air manifold duct 228, 236 to the second butterfly valve 152 associated with the failed crew pack 104, and also to the second butterfly valve 152 associated with the operable passenger pack 108. As mentioned hereinbefore, the two butterfly valves 152, 240 for each pack 104, 108 operate simultaneously. The second butterfly valve 152 for the failed pack 104 is modulated in a similar manner as if the pack 104 were operable, as described hereinbefore.

The operable passenger pack 108 operates in an identical manner as described hereinbefore with respect to two-pack operation. That is, the pack 108 is operable to provide an air supply at a desired temperature to the passenger compartment 148 in the entrance duct 324. The passenger compartment temperature controller 364 operates in a similar manner as described hereinbefore, as well, for the situation where the crew pack 104 has failed.

However, the temperature controller 248 for the crew compartment 144 now is operable to utilize the temperature signal 336 from the sensor 332 disposed downstream of the supply duct 320 in sensing the temperature of the air supply provided to the crew compartment 144. This temperature controller 248 is operable, in a similar manner as if the failed pack 104 was operable, to take the rate of change of the temperature in the entrance duct 292 and compare it to the actual temperature of the crew compartment from the temperature sensor 340, as well as compare it to the desired temperature from the adjustable device 344 provided to the controller 248. The controller 248 then utilizes any difference between these signals as an error signal to again modulate the second butterfly valve 152 associated with the failed crew pack 104. This butterfly valve 152 is modulated to regulate the amount of bleed air in the hot air manifold duct 228 that passes through the valve 152 and in the duct 288 down to the point where the bleed air is mixed with the recirculated air. Since the crew pack 104 is inoperable, the ACM 116 is not functioning. Therefore, in contrast to the situation where the pack 104 is operable, this bleed air is not mixed with any air from the turbine 140. Instead, this bleed air is only mixed with the air in the duct 296 recirculated from the passenger compartment 148. The mixed air then exits the failed pack 104 into the entrance duct 292 where it is mixed with air supplied in the supply crossover duct 320 from the operable passenger pack 108. The resulting air is then supplied to the crew compartment 144.

Thus, it can be seen from the foregoing that the ECS 100 of the present invention provides for independent temperature control of the air supplied to the compartment 144 associated with the failed pack 104. This is accomplished by the hot bleed air passing through the hot air manifold duct 228 and down through the butterfly valve 152 associated with the failed pack. This butterfly valve is modulated to adjust the temperature of the resulting mixture of the bleed air, the recirculated air, and the air supplied by the operable pack 108.

In the opposite situation where the crew pack 104 is functional and the passenger pack 108 is inoperable, the valve 204 associated with the bleed air emanating from the second engine 132 is closed, while the valve 172 associated with the bleed air from the first engine 128 is open. The bleed air is then provided from the first engine 128 through the hot air manifold duct 236 and down through the second butterfly valve 152 associated with the failed passenger pack 108. The temperature controller 364 for the passenger compartment 148 compares the rate of change of temperature in the entrance duct 324 to the passenger compartment 148 with the actual temperature of the passenger compartment 148 and the desired temperature of the passenger compartment 148. Any error signal 376 would then be utilized to modulate the second butterfly valve 152 to allow more or less hot bleed air to be mixed with the air recirculated from the passenger compartment 148 and the air supply through the supply crossover duct 320 from the operable crew pack 104.

Figure 2:
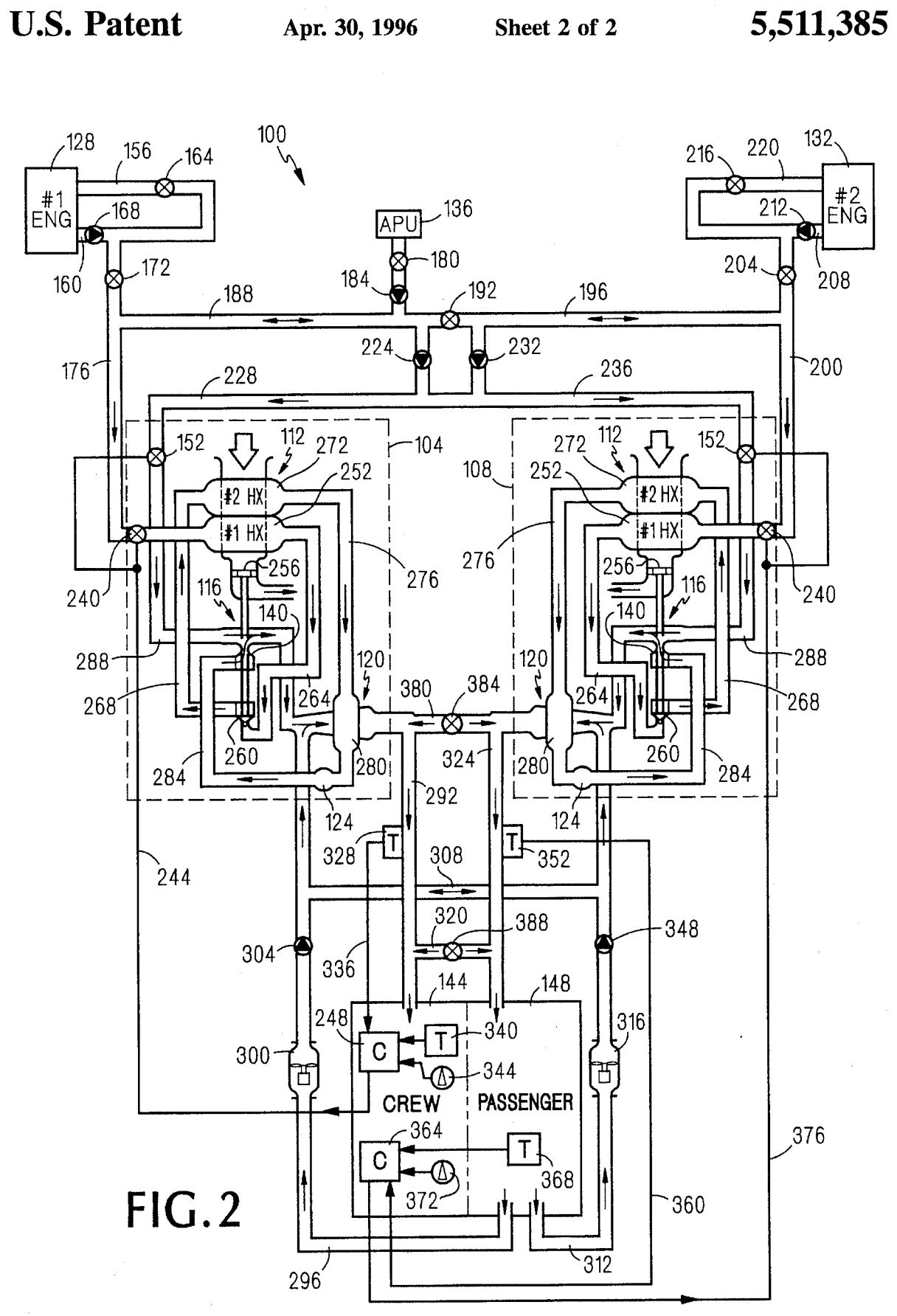

Referring now to FIG. 2, there illustrated is a schematic diagram of an alternative embodiment of an ECS 100 of the present invention. The configuration of FIG. 2 is virtually identical to that of FIG. 1, with the exception that there is now provided a second supply crossover duct 380 upstream of the first temperature sensor 328, 352 in each entrance duct 292, 324. In other words, the second supply crossover duct 380 is located at the output of each condensing heat exchanger 120 at the output of the corresponding refrigeration pack 104, 108. A shutoff valve 384 is also required in this second supply crossover duct 380. Also, in this alternative embodiment, a shutoff valve 388 is also required for the first supply crossover duct 320. Further, only one temperature sensor is provided for each entrance duct.

During normal two-pack operation, the ECS 100 of FIG. 2 operates in a similar manner to that of FIG. 1. The shutoff valve 384 in the second supply crossover duct 380 is closed to prohibit air from passing through this duct, while the shutoff valve 388 in the first supply crossover duct 320 is open. Each temperature controller 248, 364 is responsive to the temperature sensor signal on the lines 336, 360 provided by the sensor 328, 352 upstream of this first supply crossover duct 320.

However, during a failure of either pack 104, 108, the shutoff valve 384 in the second supply crossover duct 380 is now opened, while the shutoff valve 380 in the first supply crossover duct 320 is closed. Again, each temperature controller 248, 364 is responsive to the temperature signal from the sensor 328, 352 upstream of the first supply crossover duct 320. This satisfies the requirement for temperature sensing downstream of the second supply crossover duct 380. A slight drawback to the configuration of FIG. 2 involves the added cost and weight of the additional supply crossover duct 380, as well as the shutoff valves 384, 388.

In the prior art, it was known to utilize an environmental control system that somewhat resembled the ECS 100 Of FIGS. 1 or 2 in structure, but was vastly different in function during a failure of one refrigeration pack. Upon failure of one pack, the prior art ECS did not have the ability to independently control the temperature of the air supplied to the aircraft compartment associated with the failed pack. This was primarily due to the fact that hot bleed air was not provided to a modulatable butterfly valve. That is, the prior art ECS did not include the check valves 224, 232 and the hot air manifold ducts 228, 236. Also, the prior art ECS did not include temperature sensors 332, 356 downstream of the supply crossover duct 320 to sense the temperature of the conditioned air supplied to the compartment 144, 148 associated with the failed pack 104, 108. The result in this prior art scheme was that bleed air was not supplied so as to be mixed with air from the operable pack and comprise the mixed air provided to the compartment associated with the inoperable pack. That is, the air supplied to the compartment associated with the failed pack comprised, at the very least, air supplied by the operable pack, and there was no control of the temperature of the air supplied to the compartment associated with the failed pack. Such air was temperature controlled by the air provided to the compartment associated with the operable pack.

The present invention has been described for use on an environmental control system 100 comprising a pair of refrigeration packs 104, 108. It is to be understood, however, that the structure and resulting operation of each pack 104, 108 described herein is purely exemplary. Other configurations of the refrigeration pack 104, 108 may be utilized, in light of the teachings herein, without departing from the broadest scope of the present invention. It suffices for the present invention that hot bleed air supplied from a source, such as the compressor stage of an engine 128, 132 or from an APU 136, be provided to a valve 152 that can be modulated to regulate the flow of this bleed air that is mixed with the air supplied by the operable pack 104, 108. It should further be understood that mixing or utilizing recirculated air from an aircraft compartment 144, 148 is also unnecessary for the broadest scope of the present invention. It suffices that the bleed air be modulatable and mixed with the air supplied by the operable pack 104, 108 in controlling the temperature of the air supplied to the compartment 144, 148 associated with the failed pack 104, 108.

Further, utilization of a three-wheel air cycle machine 116 is purely exemplary. Other types of air cycle machines may be utilized; for example, a four-wheel air cycle machine may be utilized wherein the fourth wheel is a fan rotor that replaces the electric motor 300, 316 used to assist in the air flow of the air recirculated from each compartment 144, 148 up to the condensing heat exchanger 280.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. An aircraft environmental control system for conditioning and controlling air supplied to two or more compartments on the aircraft, the environmental control system comprising:

a. a first source of air;

b. a second source of air;

c. first refrigeration pack means for conditioning the air from the first source of air and for supplying an amount of first conditioned air at a predetermined temperature at a first entrance duct to a first compartment on the aircraft;

d. second refrigeration pack means for conditioning the air from the second source of air and for supplying an amount of second conditioned air at a predetermined temperature at a second entrance duct to a second compartment on the aircraft;

e. first valve means for regulating the amount of the air from the first source provided in a first valve duct and input to the first refrigeration pack means;

f. second valve means for regulating the amount of the air from the second source provided in a second valve duct and input to the second refrigeration pack means;

g. first crossover duct means for intermixing the first conditioned air from the first refrigeration pack means with the second conditioned air from the second refrigeration pack means prior to the first conditioned air being supplied in the first entrance duct to the first compartment on the aircraft and prior to the second conditioned air being supplied in the second entrance duct to the second compartment on the aircraft;

h. first temperature controller means for controlling the predetermined temperature of the first conditioned air supplied to the first compartment on the aircraft independent of the predetermined temperature of the second conditioned air supplied to the second compartment on the aircraft;

i. second temperature controller means for controlling the predetermined temperature of the second conditioned air supplied to the second compartment on the aircraft independent of the predetermined temperature of the first conditioned air supplied to the first compartment on the aircraft;

j. wherein in an event of inoperability of the first refrigeration pack means and operability of the second refrigeration pack means, the first temperature controller means comprises means for controlling the first valve means for regulating the amount of air from the second source and providing the regulated air to the first entrance duct where it mixes with the second conditioned air and is provided to the first compartment on the aircraft; and k. wherein in an event of inoperability of the second refrigeration pack means and operability of the first refrigeration pack means, the second temperature controller means comprises means for controlling the second valve means for regulating the amount of air from the first source and providing the regulated air to the first entrance duct where it mixes with the second conditioned air and is provided to the first compartment on the aircraft.

2. The environmental control system of claim 1, wherein the first refrigeration pack means comprises:

a. first heat exchange means for cooling the air from the first source and providing a first cool air supply;

b. compressor means for compressing the first cool air supply from the first heat exchange means and for providing a compressed air supply;

c. second heat exchange means for cooling the compressed air supply from the compressor means and for providing a second cool air supply;

d. condensing heat exchange means for cooling the second cool air supply from the second heat exchange means and for providing a third cool air supply;

e. water separator means for removing moisture from the third cool air supply from the condensing heat exchange means and for providing a dry air supply; and f. turbine means for expanding the dry air supply from the water separator means and for providing an expanded air supply, wherein the expanded air supply is mixed with the amount of air from the first source regulated by the first valve means to provide a first mixed air supply, the first mixed air supply being provided as the first conditioned air in the entrance duct.

3. The environmental control system of claim 2, wherein the air from the first source is cooled in the first heat exchange means by ram ambient air, and wherein the compressed air supply is cooled in the second heat exchange means by ram ambient air, the first heat exchange means and second heat exchange means comprising a dual heat exchange means.

4. The environmental control system of claim 3, further comprising fan means for urging the ram ambient air through the dual heat exchange means, and wherein the fan means, the turbine means and the compressor means comprise a three wheel air cycle machine.

5. The environmental control system of claim 1, further comprising means for controlling the flow of the air from the second source, the means for controlling comprising valving means that is closed during the event of inoperability of the second refrigeration pack means.

6. The environmental control system of claim 1, wherein the first source of air is an aircraft engine.

7. The environmental control system of claim 1, wherein the second source of air is an aircraft engine.

8. The environmental control system of claim 1, further comprising means for controlling the flow of the air from the first source, the means for controlling comprising valving means that is closed during the event of inoperability of the first refrigeration pack means.

9. The environmental control system of claim 1, wherein the second refrigeration pack means comprises:

a. first heat exchange means for cooling the air from the second source and providing a first cool air supply;

b. compressor means for compressing the first cool air supply from the first heat exchange means and for providing a compressed air supply;

c. second heat exchange means for cooling the compressed air supply from the compressor means and for providing a second cool air supply;

d. condensing heat exchange means for cooling the second cool air supply from the second heat exchange means and for providing a third cool air supply;

e. water separator means for removing moisture from the third cool air supply from the condensing heat exchange means and for providing a dry air supply; and f. turbine means for expanding the dry air supply from the water separator means and for providing an expanded air supply, wherein the expanded air supply is mixed with the amount of air from the second source regulated by the second valve means to provide a second mixed air supply, the second mixed air supply being provided as the second conditioned air in the entrance duct.

10. The environmental control system of claim 9, wherein the air from the second source is cooled in the first heat exchange means by ram ambient air, wherein the compressed air supply is cooled in the second heat exchange means by ram ambient air, the first heat exchange means and the second heat exchange means comprising a dual heat exchange means.

11. The environmental control system of claim 10, further comprising fan means for urging the ram ambient air through the dual heat exchange means, and wherein the fan means, the turbine means and the compressor means comprise a three wheel air cycle machine.

12. The environmental control system of claim 1, further comprising a recirculated air path for air from one of the compartments on the aircraft to be mixed with the first conditioned air.

13. The environmental control system of claim 1, further comprising a recirculated air path for air from one of the compartments on the aircraft to be mixed with the second conditioned air.

14. The environmental control system of claim 1, further comprising:

a. first temperature sensing means for sensing the temperature of the first conditioned air in the first entrance duct and for providing a first temperature signal indicative thereof;

b. second temperature sensing means for sensing the temperature of the first conditioned air in the first compartment and for providing a second temperature signal indicative thereof;

c. means for providing a desired temperature signal indicative of a desired temperature in the first compartment; and d. wherein the first temperature controller means comprises means responsive to the first temperature signal, the second temperature signal, and the desired temperature signal for controlling the predetermined temperature of the first conditioned air supplied to the first compartment.

15. The environmental control system of claim 14, wherein the first temperature sensing means comprises means for sensing the temperature of the first conditioned air in the first entrance duct upstream of the first crossover duct means.

16. The environmental control system of claim 14, further comprising third temperature sensing means for sensing the temperature of the first conditioned air in the first entrance duct downstream of the first crossover duct means and for providing a third temperature signal indicative thereof, the first temperature controller means comprising means, responsive to the first temperature signal, the second temperature signal and the desired temperature signal during operability of both the first and second refrigeration pack means for controlling the predetermined temperature of the first conditioned air supplied to the first compartment, the first temperature controller means comprising means, responsive to the third temperature signal, the second temperature signal and the desired temperature signal during inoperability of the first refrigeration pack means and operability of the second refrigeration pack means, for controlling the temperature of the first conditioned air supplied to the first compartment.

17. The environmental control system of claim 14, further comprising second crossover duct means for intermixing the first conditioned air from the first refrigeration pack means with the second conditioned air from the second refrigeration pack means prior to the first conditioned air being supplied in the first entrance duct to the first compartment and prior to the second conditioned air being supplied in the second entrance duct to the second compartment, the second crossover duct means being provided upstream of the first temperature sensing means and the first crossover duct means, the second crossover duct means including third valve means for selectively preventing the intermixing of the first conditioned air from the first refrigeration pack means with the second conditioned air from the second refrigeration pack means during inoperability of the first refrigeration pack means or inoperability of the second refrigeration pack means, the first crossover duct means including fourth valve means for selectively preventing the intermixing of the first conditioned air from the first refrigeration pack means with the second conditioned air from the second refrigeration pack means during operability of both the first refrigeration pack means and the second refrigeration pack means.

18. The environmental control system of claim 1, further comprising:

a. first temperature sensing means for sensing the temperature of the second conditioned air in the second entrance duct and for providing a first temperature signal indicative thereof;

b. second temperature sensing means for sensing the temperature of the second conditioned air in the second compartment and for providing a second temperature signal indicative thereof;

c. means for providing a desired temperature signal indicative of a desired temperature in the second compartment; and d. wherein the second temperature controller means comprises means responsive to the first temperature signal, the second temperature signal, and the desired temperature signal for controlling the predetermined temperature of the second conditioned air supplied to the second compartment.

19. The environmental control system of claim 18, wherein the first temperature sensing means comprises means for sensing the temperature of the second conditioned air in the second entrance duct upstream of the first crossover duct means.

20. The environmental control system of claim 18, further comprising third temperature sensing means for sensing the temperature of the second conditioned air in the second entrance duct downstream of the first crossover duct means and for providing a third temperature signal indicative thereof, the second temperature controller means comprising means, responsive to the first temperature signal, the second temperature signal and the desired temperature signal during operability of both the first and second refrigeration pack means for controlling the predetermined temperature of the second conditioned air supplied to the second compartment, the second temperature controller means comprising means, responsive to the third temperature signal, the second temperature signal and the desired temperature signal during inoperability of the first refrigeration pack means and operability of the second refrigeration pack means, for controlling the temperature of the second conditioned air supplied to the second compartment.

21. The environmental control system of claim 18, further comprising second crossover duct means for intermixing the first conditioned air from the first refrigeration pack means with the second conditioned air from the second refrigeration pack means prior to the first conditioned air being supplied in the first entrance duct to the first compartment and prior to the second conditioned air being supplied in the second entrance duct to the second compartment, the second crossover duct means being provided upstream of the first temperature sensing means and the first crossover duct means, the second crossover duct means including third valve means for selectively preventing the intermixing of the first conditioned air from the first refrigeration pack means with the second conditioned air from the second refrigeration pack means during inoperability of the first refrigeration pack means or inoperability of the second refrigeration pack means, the first crossover duct means including fourth valve means for selectively preventing the intermixing of the first conditioned air from the first refrigeration pack means with the second conditioned air from the second refrigeration pack means during operability of both the first refrigeration pack means and the second refrigeration pack means.

* * * * *